US007056485B2

(12) United States Patent
Creutz et al.

(10) Patent No.: US 7,056,485 B2
(45) Date of Patent: Jun. 6, 2006

(54) CONTINUOUS HYDROGENATION PROCESS

(75) Inventors: Matthias Creutz, Frankfurt (DE); Hubertus Eickhoff, Alzenau (DE); Bernhard Maurer, Feistritz/Drau (AT)

(73) Assignee: Degussa AG, Düsseldorf (DE)

( * ) Notice: Subject to any disclaimer, the term of this patent is extended or adjusted under 35 U.S.C. 154(b) by 261 days.

(21) Appl. No.: 10/683,867

(22) Filed: Oct. 14, 2003

(65) Prior Publication Data
US 2004/0136897 A1    Jul. 15, 2004

(30) Foreign Application Priority Data
Oct. 16, 2002    (DE)    ................................ 102 48 159

(51) Int. Cl.
     *C01B 15/023*    (2006.01)
(52) U.S. Cl. .................. 423/588; 423/589; 423/590; 423/659; 564/415; 564/490; 568/814; 568/880; 568/881; 585/250; 585/266
(58) Field of Classification Search ................. 423/588, 423/589, 590, 659; 564/415, 490; 568/814, 568/880, 881; 585/250, 266
See application file for complete search history.

(56) References Cited

U.S. PATENT DOCUMENTS

| 4,234,560 | A | * | 11/1980 | Kuerten et al. | ............. | 423/659 |
| 4,428,923 | A | * | 1/1984 | Kunkel et al. | ............. | 423/588 |
| 6,150,564 | A | | 11/2000 | Bröcker et al. | ............. | 568/462 |
| 6,342,199 | B1 | * | 1/2002 | Ellis | ............. | 423/659 |
| 6,861,042 | B1 | * | 3/2005 | Korl et al. | ............. | 423/588 |
| 2002/0052532 | A1 | | 5/2002 | Korl et al. | ............. | 585/250 |

FOREIGN PATENT DOCUMENTS

| DE | 100 52 323 | 5/2002 |
| EP | 0 111 133 | 6/1984 |
| EP | 0 384 905 | 8/1990 |
| EP | 0 812 297 | 12/1997 |

OTHER PUBLICATIONS

*Ullmann's Encyclopedia of Industrial Chemistry*, vol. A13:447-456 (1989), no month.
Laporte Chemicals, *Chemical & Process Engineering*, pp. 5-6 (Jan. 1959).
English language abstract for EP 0 111 133, Reference AF1 above.
English language abstract for EP 0 812 297, Reference AH1 above.
English language abstract for DE 100 52 323, Reference AI1 above.

* cited by examiner

*Primary Examiner*—Wayne A. Langel
(74) *Attorney, Agent, or Firm*—Michael A. Sanzo; Fitch, Even, Tabin & Flannery

(57) ABSTRACT

The invention is directed to a continuous hydrogenation process in which a hydrogenable compound is dissolved in a working solution with hydrogen and a heterogeneous catalyst. At least part of the hydrogen-containing waste hydrogenation gas generated in the reaction is compressed and then recycled into the hydrogenation reactor. A jet pump is used for the compression of the waste hydrogenation gas and a liquid or gaseous feedstock of the hydrogenation process is used as the motive agent. Preferred motive agents are the hydrogenation gas or a working solution recycled into the process. The process is particularly suitable for performing the hydrogenation step in the anthraquinone process for the production of hydrogen peroxide.

10 Claims, No Drawings

CONTINUOUS HYDROGENATION PROCESS

CROSS REFERENCE TO RELATED APPLICATIONS

This application claims priority to German application no. 102 48 159.8, filed on Oct. 16, 2002, which is incorporated in its entirety herein by reference.

FIELD OF THE INVENTION

The present invention is directed to a process for the continuous hydrogenation of a compound by hydrogen in the presence of a heterogeneous catalyst. Hydrogen-containing waste gas generated during the process is recovered and recycled into the hydrogenation reactor using a jet pump.

BACKGROUND OF THE INVENTION

Continuous hydrogenation of compounds may take place in a solvent or mixture of solvents in the presence of a heterogeneous catalyst and hydrogen under elevated pressure. Typically, the hydrogenated compounds are then separated from at least part of the hydrogenation solution and the remaining solution is returned to the reaction. Depending on the design of the hydrogenation reactor and the reaction conditions, a hydrogen-containing waste gas is formed during this process. To increase economic efficiency, it is desirable to compress at least part of this waste hydrogenation gas and return it to the reaction.

A generic hydrogenation process which can be operated on an industrial scale is the anthraquinone process for the production of hydrogen peroxide (see, Ullmann's Encyclopedia of Industrial Chemistry, vol. A13:447–456 (1989)). In this, a working solution is formed by dissolving one or more reaction supports (anthraquinone derivatives and/or tetrahydroanthraquinone derivatives) in an organic solvent or mixture of solvents. Hydrogenation then takes place in the presence of a suspension or fixed bed catalyst. During the hydrogenation step, at least a portion of the derivatives is converted to the corresponding anthrahydroquinone derivative(s) or tetrahydroanthrahydroquinone derivative(s). Hydrogenated working solution freed of catalyst is gassed in a subsequent oxidation step with oxygen or an oxygen-containing gas, usually air, to convert the reaction support back into the quinone form with the formation of hydrogen peroxide. The hydrogen peroxide formed is extracted from this "oxidized working solution" using water or a dilute aqueous hydrogen peroxide solution. The "extracted working solution" thus obtained (which contains the reaction support or supports in oxidised form) is returned to the hydrogenation reaction. In practice, only part of the hydrogenated working solution is fed into the oxidation step; the greater part is returned directly into the hydrogenation step (hydrogenation circuit).

EP-B 0 111 133 describes a anthraquinone process in which hydrogenation takes place in a loop reactor in such a way that hydrogen reacts substantially completely and essentially only inert gases are flushed out from a pump supply vessel, which simultaneously acts as a gas separator. In order to favour hydrogenation kinetics, however, it can also be advantageous to work in such a way that the waste hydrogenation gas contains hydrogen. In general, if there is a small quantity of hydrogen in the waste hydrogenation gas, it is preferably burnt. If there is a larger quantity of hydrogen in the waste hydrogenation gas, then it is preferable to feed this back to the reaction. In addition, in tubular reactors as well as other hydrogenation reactors, e.g., gas-lift reactors or fixed bed reactors, situations can arise where hydrogen or a hydrogen/inert gas mixture has to be recycled.

In the anthraquinone process of Laporte Chemicals (Chemical and Process Engineering, 01/1959, 5–6 and 452–453 of the Ullmann document cited above) hydrogenation takes place in the presence of a suspension catalyst in a gas-lift reactor. Since the hydrogen does not react completely on one pass through the reactor, it is used in excess and the waste hydrogenation gas is compressed and recycled together with fresh hydrogen.

Mechanical gas compressors, e.g. compressors working on the fluid principle, have generally been used to compress hydrogen-containing waste hydrogenation gas drawn off from a separator downstream of the reactor or from the reactor chamber itself. These compressors are electrically driven, consume a large amount of energy and require high-maintenance. To avoid these disadvantages, steam operated injectors have sometimes been used for the intake and compression of waste hydrogenation gas (see EP patent 0 812 297). One disadvantage of these injectors is that they can only be used economically in a location where excess steam is available, e.g., in a paper factory. Another disadvantage of is that the waste hydrogenation gas compressed has to be separated from the steam condensate formed before it can be fed into the hydrogenation reactor. If there is insufficient separation, an undesirably large amount of water can pass into the reactor, resulting in a reduction in the hydrogenation activity of the suspension catalyst.

SUMMARY OF THE INVENTION

The present invention is directed to an improved continuous hydrogenation process in which hydrogen-containing waste hydrogenation gas is compressed and recycled using a jet pump. The process is particularly useful for performing the hydrogenation step within the framework of the anthraquinone process for the production of hydrogen peroxide.

The process involves dissolving the compound undergoing hydrogenation in a working solution and combining this with a hydrogen-containing hydrogenation gas in a hydrogenation reactor. The mixture thus produced is then reacted to obtain at least partly hydrogenated compounds and a hydrogen-containing waste hydrogenation gas. A portion of the waste hydrogenation gas is compressed using a jet pump and recycled back into the hydrogenation reactor. The hydrogenation reactor also has a liquid or gaseous feedstock that is fed in at a pressure that is greater than the pressure at which the compressed hydrogenation gas is fed in. This feedstock is used as motive agent for the jet pump. The hydrogenation may be performed in a loop reactor, gas-lift reactor, fluidised bed reactor, tubular reactor or stirred vessel reactor in the presence of a palladium-containing heterogeneous hydrogenation catalyst.

In a preferred embodiment the hydrogen containing hydrogenation gas is hydrogen from a steam reformer, and a gas jet pump is used to compress the waste hydrogen gas. Alternatively, a non-hydrogenated working solution or a liquid component of a non-hydrogenated working solution may be used as the motive medium and a liquid jet pump is used to compress the waste hydrogen gas.

In another preferred embodiment, the process is used to carry out the hydrogenation step of the anthraquinone process for the production of hydrogen peroxide. In this, anthraquinone derivatives and/or tetrahydroanthraquinone derivatives dissolved in a working solution are hydrogenated to the corresponding anthrahydroquinone and/or tetrahydroanthrahydroquinone derivatives and oxidised. The hydrogen peroxide formed from the oxidation step is extracted from the solution with water and/or a dilute aqueous hydrogen peroxide solution. The extracted working solution is then recycled into the hydrogenation reactor and at least part of this extracted solution is used as the motive agent for the compression of the waste hydrogenation gas. Preferably, the waste hydrogenation gas is compressed using a gas jet pump with a hydrogen-containing hydrogenation gas as motive agent; the gas mixture obtained in this manner is mixed with extracted working solution using a venturi nozzle; and the mixture is fed into the hydrogenation reactor.

In general, the hydrogenation process may be performed under a pressure in the range of 0.1 MPa to 2.0 MPa (absolute) and at a temperature in the range of 20 to 100° C. The sum of the waste hydrogenation gas stream and the motive gas stream used for the compression should preferably be less than that of the hydrogenation gas stream introduced into the hydrogenation reactor, whereby each stream is calculated at standard temperature and standard pressure. The pressure of the stream of extracted working solution used for the compression of the waste hydrogenation gas stream may also be equal to or less than that of the stream of extracted working solution fed into the hydrogenation.

DETAILED DESCRIPTION OF THE INVENTION

A process has been developed for the continuous hydrogenation of a working solution containing a compound capable of being hydrogenated. The reaction is performed using hydrogen in the presence of a heterogeneous catalyst, and comprises: a) introducing the working solution and/or components of the working solution and a hydrogen-containing hydrogenation gas into a hydrogenation reactor, b) hydrogenating the mixture under conditions in which at least partly hydrogenated working solution and a hydrogen-containing waste hydrogenation gas are obtained, and c) using a jet pump to compress at least a portion of the waste hydrogenation gas and then recycling it into the hydrogenation reactor. An important characteristic of the process is that the motive agent for the jet pump is a gaseous or liquid feedstock that is fed into the hydrogenation reactor at a pressure that is greater than the hydrogenation pressure at the location where the compressed gas is fed. In so far as the motive agent available in the process is a gaseous feedstock, e.g., a hydrogen-containing hydrogenation gas under adequate pressure, a gas jet pump is used as the jet pump.

In a preferred embodiment, the hydrogen-containing hydrogenation gas is hydrogen from a steam reformer, wherein natural gas or a light petroleum fraction is converted to hydrogen and carbon monoxide using steam. Depending on the operating conditions, the hydrogen pressure at the outlet of such a plant is usually in the range of 8 to 15 bar. As an alternative to hydrogen from a cracked gas plant, hydrogen from another source, e.g. a partial oxidation of heavy fuel oil or a reforming process, can be used as hydrogenation gas and motive agent provided that the pressure available is sufficient, i.e. does not first have to be produced by compression using a mechanical compressor. The hydrogen stream coming from a cracked gas plant or another production plant is often available at too high a pressure and has to be reduced to the necessary reaction pressure upstream of the hydrogenation reactor. This energy potential can be utilised according to the invention to operate the gas jet pump for the compression of waste hydrogenation gas to the required feed pressure.

According to an alternative embodiment, a liquid starting substance is used as the motive medium and a liquid jet pump as the jet pump. The liquid starting substance is preferably a non-hydrogenated working solution or a liquid component thereof to be fed into the hydrogenation circuit. In the anthraquinone process, the non-hydrogenated working solution is the oxidised working solution freed of hydrogen peroxide (i.e., extracted working solution). The required motive pressure in these cases is produced using a mechanical pump.

The process according to the invention is suitable for any compounds capable of hydrogenation with hydrogen, and which can be passed through the hydrogenation reactor in the form of a solution. Olefins, aromatic and heteroaromatic rings and carbonyl compounds and nitriles can all be used. The substance being hydrogenated can, provided that it is liquid under the operating conditions, be used as such or it can be used in the form of a solution, in a solvent or in a mixture of solvents.

The process according to the invention is particularly well suited to performing the hydrogenation step within the framework of the anthraquinone process for the production of hydrogen peroxide. As already stated in the discussion of the prior art, a working solution containing anthraquinone derivatives and/or tetrahydroanthraquinone derivatives in an appropriate solvent or mixture of solvents is at least partly hydrogenated. A portion of the hydrogenated working solution is then oxidised in an oxidation step. After the extraction of the hydrogen peroxide contained in the oxidised working solution, the extracted working solution obtained is fed back into the hydrogenation step, optionally after drying. According to one embodiment, at least part of the extracted working solution is used as motive agent for a liquid jet pump for the compression of the waste hydrogenation gas. Alternatively, the hydrogenation gas, preferably hydrogen from a steam reformer, can also be used as motive agent for a gas jet pump for the compression of the hydrogenation gas.

The liquid jet pumps for the compression of the waste hydrogenation gas stream are designed in such a way that the motive stream is equal to or less than the one being fed into the hydrogenation circuit. When a gas jet pump is used, the sum of the waste hydrogenation gas stream and the motive gas stream used for the compression thereof is not greater than the feedstock gas stream required for the hydrogenation, whereby each stream is calculated at standard temperature and standard pressure.

In the process according to the invention, known liquid jet pumps or gas jet pumps can be used. These jet pumps, also known as suction-based motive-agent compressors or injectors, convey and compress gas using motive gas under elevated pressure or a motive liquid. The pressurised motive agent flows at high speed from a motive nozzle, sucks in the surrounding gas being pumped, i.e., the waste hydrogenation gas in the process according to the invention, mixes with this and transfers part of its kinetic energy to the aspirated gas as pressure energy. In contrast to mechanical compressors, which have been used for the compression of waste hydrogenation gas, motive-agent compressors have a simple design; they possess no moving parts and are therefore low-maintenance. Methods for constructing motive-agent compressors are well known in the art (see, for example, Ullmann's Encyclopedia of Industrial Chemistry, $4^{th}$ edition, vol. 3 page 172 (1973)). By using a motive-agent compressor, the economic efficiency of the process is increased in that hydrogen-containing waste hydrogenation gas can be fed into the hydrogenation reactor simply, using a device of simple design.

Another advantage of the process of the present invention lies in the fact that only substances which are used in the process are employed as the motive agent. Preferably, the hydrogenation gas itself or the non-hydrogenated working solution are recycled into the hydrogenation circuit or a solvent or solvent mixture thereof. The device used in connection with the invention, (particularly a gas jet pump operated with hydrogen gas or a liquid jet pump operated with an oxidised working solution freed of $H_2O_2$) is distinguished from other the devices previously used for this purpose by the fact that it is of simple construction and no other external energy is needed to suck off the waste hydrogenation gas (i.e., residual reaction gas) and feed it back into the hydrogenation step.

In the continuous hydrogenation process for the production of hydrogen peroxide, hydrogenation reactors known in the art can be used. Particularly suitable types of reactor are stirred vessels, gas-lift reactors, fluidised bed reactors or loop reactors. These reactors may be particularly used for hydrogenation in the presence of a suspension catalyst. Hydrogenation reactors may also be continuous flow reactors with a fixed catalyst bed arranged in the reactor, which can also be designed as a monolith, the walls of which are coated with the catalyst.

In the particularly preferred anthraquinone process for the production of hydrogen peroxide, anthraquinone derivatives or tetrahydroanthraquinone derivatives are used as reaction supports and at least partially hydrogenated in the hydrogenation step. The reaction supports are preferably 2-alkyl-substituted anthraquinones or the corresponding 2-alkyl tetrahydroanthraquinones, the alkyl group of which has 1 to 8 C atoms and can be linear or branched. Examples of these are 2-ethyl-, 2-amyl-(mixture of isomers), 2-tert.-butyl- and 2-isohexylanthraquinones and their tetrahydro derivatives.

In the anthraquinone process, both quinone solvents and hydroquinone solvents are used as solvent components. Suitable solvents may be found in the Ullmann citation cited above.

Any heterogeneous catalysts effective in hydrogenation can be used in connection with the present process. In the anthraquinone process for the production of hydrogen peroxide, palladium-containing catalysts are preferably used. These can be extremely fine particles of palladium (Pd black) or a palladium alloy. Alternatively, they may be support-bonded catalysts with palladium and, optionally, other metals effective in hydrogenation, particularly those from the $8^{th}$ subgroup of the periodic table.

The pressure and temperature conditions in the hydrogenation can be very varied and will depend particularly on the compound to be hydrogenated, the activity of the catalyst used and the design of the hydrogenation reactor. In the anthraquinone process for the production of hydrogen peroxide, the hydrogenation is preferably performed under a pressure in the range of more than 0.1 MPa to 2.0 MPa (absolute) and at a temperature in the range of 20 to 100° C., particularly 30 to 60° C.

According to another preferred embodiment, the waste hydrogenation gas compressed by means of a gas jet pump is dispersed (in a mixture with the hydrogenation gas used as motive agent and using a venturi nozzle as the gas-introducing device) into catalyst-free, oxidised working solution freed of $H_2O_2$. It is only then that it is fed into the catalyst-containing hydrogenation circuit (cf. DE 100 52 323 A1).

In the present process, the hydrogen contained in the waste hydrogenation gas can be at least partly returned to the hydrogenation step using a simple device and without a requirement for additional energy. As a result, the entire process becomes more economical. The process is explained in more detail by the following examples.

EXAMPLES

Example 1

Process for the Production of Hydrogen Peroxide by the Anthraquinone Process and Use of a Gas Jet Pump In a plant for the production of hydrogen peroxide by the anthraquinone process, a working solution is hydrogenated with hydrogen in a loop reactor, hydrogen being used in excess. The reaction mixture leaving the reactor is separated into a liquid phase and a gas phase in a vessel. The gas phase is the waste hydrogenation gas containing hydrogen. This is compressed using a gas jet pump from an absolute pressure of 3.5 bar (0.5 MPa) to 5.5 bar (0.55 MPa). The suction stream is 150 m$^3$/h (at standard temperature and pressure). 1230 m$^3$/h (at standard temperature and pressure) of hydrogen gas with an absolute pressure of 11 bar (0.11 MPa) is used as the motive stream. This quantitative stream is smaller than the feedstock gas stream needed for the reaction. Thus, it is ensured that, under these operating conditions, no external energy is needed to compress the desired suction stream. At the same time, the hydrogen-containing waste hydrogenation gas is mixed with fresh hydrogen and the mixture is fed into the hydrogenation circuit through a venturi nozzle.

Example 2

Process for the Production of Hydrogen Peroxide Using a Liquid Jet Pump

In a plant for the production of hydrogen peroxide by the anthraquinone process using a loop reactor as hydrogenation reactor, the hydrogen-containing waste hydrogenation gas is compressed from an absolute pressure of 2.0 bar (0.2 MPa) to 4.0 bar (0.4 MPa). The suction stream is 250 to 500 m$^3$/h (at standard temperature and pressure). An oxidised working solution subsequently freed of hydrogen peroxide by extraction is used as the motive stream for a liquid jet pump. For the compression, 340 m$^3$/h of this working solution is used with a motive pressure of 7 bar (0.7 MPa) (absolute). This quantitative stream is smaller than the feedstock stream for the working solution needed for the reaction. No other external energy is needed to compress the desired suction stream. At the same time, the hydrogen-containing waste hydrogenation gas is mixed with the oxidised working solution freed of $H_2O_2$ and the mixture is introduced into the hydrogenation reactor.

All references cited herein are fully incorporated by reference. Having now fully described the invention, it will be understood by those of skill in the art that the invention may be performed within a wide and equivalent range of conditions, parameters and the like, without affecting the spirit or scope of the invention or any embodiment thereof.

What is claimed is:

1. A process for the continuous hydrogenation of a compound capable of being hydrogenated, comprising:

a) dissolving the compound in a working solution and combining said working solution with a hydrogen-containing hydrogenation gas in a hydrogenation reactor;

b) hydrogenating the mixture produced in step a) under hydrogenation conditions to obtain an at least partly hydrogenated compound and a hydrogen-containing waste hydrogenation gas;

c) compressing part of the waste hydrogenation gas using a jet pump and recycling the compressed gas into the hydrogenation reactor, wherein a liquid or gaseous feedstock is fed into the hydrogenation reactor at a pressure that is greater than the pressure at which the compressed hydrogenation gas is fed into the hydrogenation reactor and is used as motive agent for the jet pump.

2. The process of claim 1, wherein hydrogen-containing hydrogenation gas is used as said motive medium and a gas jet pump is used as said jet pump.

3. The process of claim 1, wherein a non-hydrogenated working solution or a liquid component of a non-hydrogenated working solution is used as said motive medium and a liquid jet pump is used as said jet pump.

4. The process of any one of claims 1 to 3, wherein said continuous hydrogenation is the hydrogenation step of the anthraquinone process for the production of hydrogen peroxide, comprising:

a) at least partially hydrogenating anthraquinone derivatives and/or tetrahydroanthraquinone derivatives dissolved in a working solution to the corresponding anthrahydroquinone and/or tetrahydroanthra-hydroquinone derivatives;

b) oxidising the hydrogenated working solution;

c) extracting hydrogen peroxide formed from the oxidised working solution with water and/or a dilute aqueous hydrogen peroxide solution; and d) recycling the extracted working solution is into the hydrogenation reactor.

5. The process of claim 4, wherein at least part of the extracted working solution is used as motive agent for the compression of the waste hydrogenation gas.

6. The process of claim 4, wherein:

a) the waste hydrogenation gas is compressed using a gas jet pump with a hydrogen-containing hydrogenation gas as motive agent;

b) the gas mixture obtained from step a) is mixed with extracted working solution using a venturi nozzle; and c) the mixture is fed into the hydrogenation reactor.

7. The process of claim 4, wherein:

a) said hydrogenation is performed under a pressure in the range of 0.1 MPa to 2.0 MPa (absolute) and at a temperature in the range of 20 to 100° C.; and b) part of the hydrogenated working solution is recycled into the reactor.

8. The process of claim 4, wherein the sum of the waste hydrogenation gas stream and the motive gas stream used for the compression thereof is less than that of the hydrogenation gas stream introduced into the hydrogenation reactor, and further wherein each stream is calculated at standard temperature and standard pressure.

9. The process of claim 4, wherein the volume of the stream of extracted working solution used for the compression of the waste hydrogenation gas stream is equal to or less than that of the stream of extracted working solution fed into the hydrogenation.

10. The process of claim 4, wherein the hydrogenation is performed in a loop reactor, gas-lift reactor, fluidised bed reactor, tubular reactor or stirred vessel reactor in the presence of a palladium-containing heterogeneous hydrogenation catalyst.

* * * * *